(12) United States Patent
Nguyen et al.

(10) Patent No.: US 10,936,369 B2
(45) Date of Patent: Mar. 2, 2021

(54) MAINTENANCE OF LOCAL AND GLOBAL LISTS OF TASK CONTROL BLOCKS IN A PROCESSOR-SPECIFIC MANNER FOR ALLOCATION TO TASKS

(71) Applicant: INTERNATIONAL BUSINESS MACHINES CORPORATION, Armonk, NY (US)

(72) Inventors: Trung N. Nguyen, Tucson, AZ (US); Sean P. Riley, Tucson, AZ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 230 days.

(21) Appl. No.: 14/546,522

(22) Filed: Nov. 18, 2014

(65) Prior Publication Data

US 2016/0139953 A1 May 19, 2016

(51) Int. Cl.
*G06F 9/50* (2006.01)
*G06F 9/46* (2006.01)

(52) U.S. Cl.
CPC .......... *G06F 9/5016* (2013.01); *G06F 9/463* (2013.01)

(58) Field of Classification Search
CPC .............................. G06F 9/4818; G06F 9/4881
See application file for complete search history.

(56) References Cited

U.S. PATENT DOCUMENTS

| 5,349,656 | A | * | 9/1994 | Kaneko et al. | 395/650 |
| 5,465,335 | A |  | 11/1995 | Anderson |  |
| 5,692,193 | A | * | 11/1997 | Jagannathan | G06F 8/451 711/6 |
| 6,636,940 | B1 | * | 10/2003 | Hodges | G06F 3/0601 710/5 |
| 6,834,385 | B2 |  | 12/2004 | Bohm et al. |  |
| 6,990,608 | B2 |  | 1/2006 | Wisler et al. |  |
| 8,151,102 | B2 |  | 4/2012 | Itoh |  |
| 9,658,888 | B2 | * | 5/2017 | Benhase | G06F 9/5016 |
| 2005/0240928 | A1 | * | 10/2005 | Brown | G06F 9/5061 718/100 |
| 2006/0101469 | A1 | * | 5/2006 | Hathorn | G06F 9/5016 718/104 |

(Continued)

OTHER PUBLICATIONS

Bellosa, Frank et al. "The Performance Implications of Locality Information Usage in Shared-Memory Multiprocessors." Journal of Parallel and Distributed Computing. vol. 37, Issue 1, pp. 113-121. Aug. 25, 1996.*

(Continued)

*Primary Examiner* — Meng Ai T An
*Assistant Examiner* — Michael W Ayers
(74) *Attorney, Agent, or Firm* — Griffiths & Seaton PLLC (57) ABSTRACT

In a computing storage environment having multiple processor devices, lists of Task Control Blocks (TCBs) are maintained in a processor-specific manner, such that each of the multiple processor devices is assigned a local TCB list. The local TCB list of each of the multiple processor devices is populated with a respective number of TCBs from a global TCB list. The local TCB list of each of the multiple processor devices exchanges TCBs with the global TCB list during processes to maintain the local TCB list of each of the multiple processor devices at the respective number.

6 Claims, 4 Drawing Sheets

(56) References Cited

U.S. PATENT DOCUMENTS

| | | | |
|---|---|---|---|
| 2009/0019439 A1* | 1/2009 | Kwon | G06F 9/5027 |
| | | | 718/100 |
| 2009/0222621 A1* | 9/2009 | Ash | G06F 3/0613 |
| | | | 711/112 |
| 2009/0249055 A1* | 10/2009 | Itoh | G06F 9/4401 |
| | | | 713/2 |
| 2010/0211948 A1* | 8/2010 | Philip | G06F 9/526 |
| | | | 718/100 |
| 2011/0078700 A1* | 3/2011 | Blackburn | G06F 9/505 |
| | | | 718/105 |
| 2011/0212761 A1 | 9/2011 | Paulsen et al. | |
| 2013/0247067 A1* | 9/2013 | Schmit | G06F 9/4881 |
| | | | 718/105 |
| 2016/0103764 A1* | 4/2016 | Banerjee | G06F 3/061 |
| | | | 711/129 |

OTHER PUBLICATIONS

Moore, Ralph, "Deferred Interrupt Processing", µd Micro Digital, 2005.
Suh, et al., "Integrating Cache Coherence Protocols for Heterogeneous Multiprocessor Systems, Part 2", IEEE Computer Society Press, 2004, 24(4), 33-41. doi: 10.1109/MM.2004.33.
"Method and System for Freeing Cells in a Storage Pool", Dec. 15, 2013, IP.com, IPCOM000233571D.

* cited by examiner

MAINTENANCE OF LOCAL AND GLOBAL LISTS OF TASK CONTROL BLOCKS IN A PROCESSOR-SPECIFIC MANNER FOR ALLOCATION TO TASKS

BACKGROUND OF THE INVENTION

Field of the Invention

The present invention relates in general computing systems, and more particularly to, systems and methods for increased data management efficiency in computing storage environments.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written. As a result, cache memory structures play an important role in computing systems for overall functioning.

SUMMARY OF THE INVENTION

Storage controller devices in computer storage systems may have their own scheduler for tasks that are running on the Central Processing Units (CPUs) associated with the particular storage controller. Many of these tasks concern the same control blocks (data structures) each time the tasks are dispatched.

In one such computer storage system, for example, these tasks may execute on any of the CPUs. As a result, a particular task fetches its control blocks, and another task fetches data into a single CPU, and the task finishes processing. Then, later on, the task may execute on another CPU, and fetch the same set of control blocks on other Level 1/Level 2 (L1/L2) cache lines. When the control blocks are fetched on another CPU, (1) if the control blocks are being updated, then those control blocks need to be invalidated on the other CPU's cache, and (2), those control blocks will need to be fetched on the new CPU's cache lines. These operations incur expenditure of resources and may impact performance. A need exists for a mechanism for more effective CPU task management in such scenarios to improve overall computing performance.

Accordingly, and in view of the foregoing, various embodiments for data management in a computing storage environment having multiple processor devices, are provided. In one embodiment, by way of example only, a method for data management in a computing storage environment having multiple processor devices is provided. Lists of Task Control Blocks (TCBs) in a processor-specific manner are maintained, such that each of the multiple processor devices is assigned a local TCB list.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, storage controller devices in computer storage systems may have their own scheduler for tasks that are running on the Central Processing Units (CPUs) associated with the particular storage controller. Many of these tasks concern the same control blocks (data structures) each time the tasks are dispatched.

In one such computer storage system, for example, these tasks may execute on any of the CPUs. As a result, a particular task fetches its control blocks, and another task fetches data into a single CPU, and the task finishes processing. Then, later on, the task may execute on another CPU, and fetch the same set of control blocks on other Level 1/Level 2 (L1/L2) cache lines. When the control blocks are fetched on another CPU, (1) if the control blocks are being updated, then those control blocks need to be invalidated on the other CPU's cache, and (2), those control blocks will need to be fetched on the new CPU's cache lines. These operations incur expenditure of resources and may impact performance.

One possible solution to address the two requirements discussed previously is to bind the tasks to a group of CPUs that share a set of L1/L2 cache. This solution presents challenges, however, as some CPUs may receive longer dispatch queues since their tasks may be short or fewer in number. As a result, some CPUs will remain idle for certain periods of time, whereas other CPUs may be too busy.

The illustrated embodiments, alternatively, avoid this potential challenge by, for example, maintaining a processor-specific local Task Control Block (TCB) list. In this manner, a local TCB list is maintained for each of the multiple processors in the environment. Additionally, a global TCB list is also maintained. The interaction between local and global TCB lists will be further described, following, in an exemplary embodiment. Accordingly, in one exemplary embodiment, "hit ratios" in cache memory are improved, which corresponds to an overall increase in data management performance in the computing environment.

In one of the illustrated embodiments, the set of tasks described above may include a number of operations executing in a computing storage environment, including such tasks as a Non Volatile Storage (NVS) operation, a data stage operation, a data destage operation, a read operation, a write operation, an Operating System (OS) operation, or a copy operation.

Accordingly, in view of this storage-centric embodiment, groups of tasks (or like type groups) are migrated between CPU groups (which, for example, may share L1/L2/L3 cache, and/or lock acquisition and free hardware resources) while preventing large skew in CPU queue depths. Such queue depths will be further described, following. "Queue depth" represents a useful metric since it reflects both CPU load, and a likelihood of future data/lock residence in, for example, the L1/L2/L3 caches. In other words, the larger the queue depth, the more likely data/locks will age out of L1/L2/L3 before a task gets re-dispatched.

More generally, the mechanisms of the illustrated embodiments alleviate the necessity of tasks binding and balancing algorithms that may be utilized by other approaches to task management among multiple processors. In addition, the mechanisms of the illustrated embodiments result in greater effectiveness by addressing the increased cache locality for task control block data, as this data will frequently be found in one CPU cache.

Figure 1:
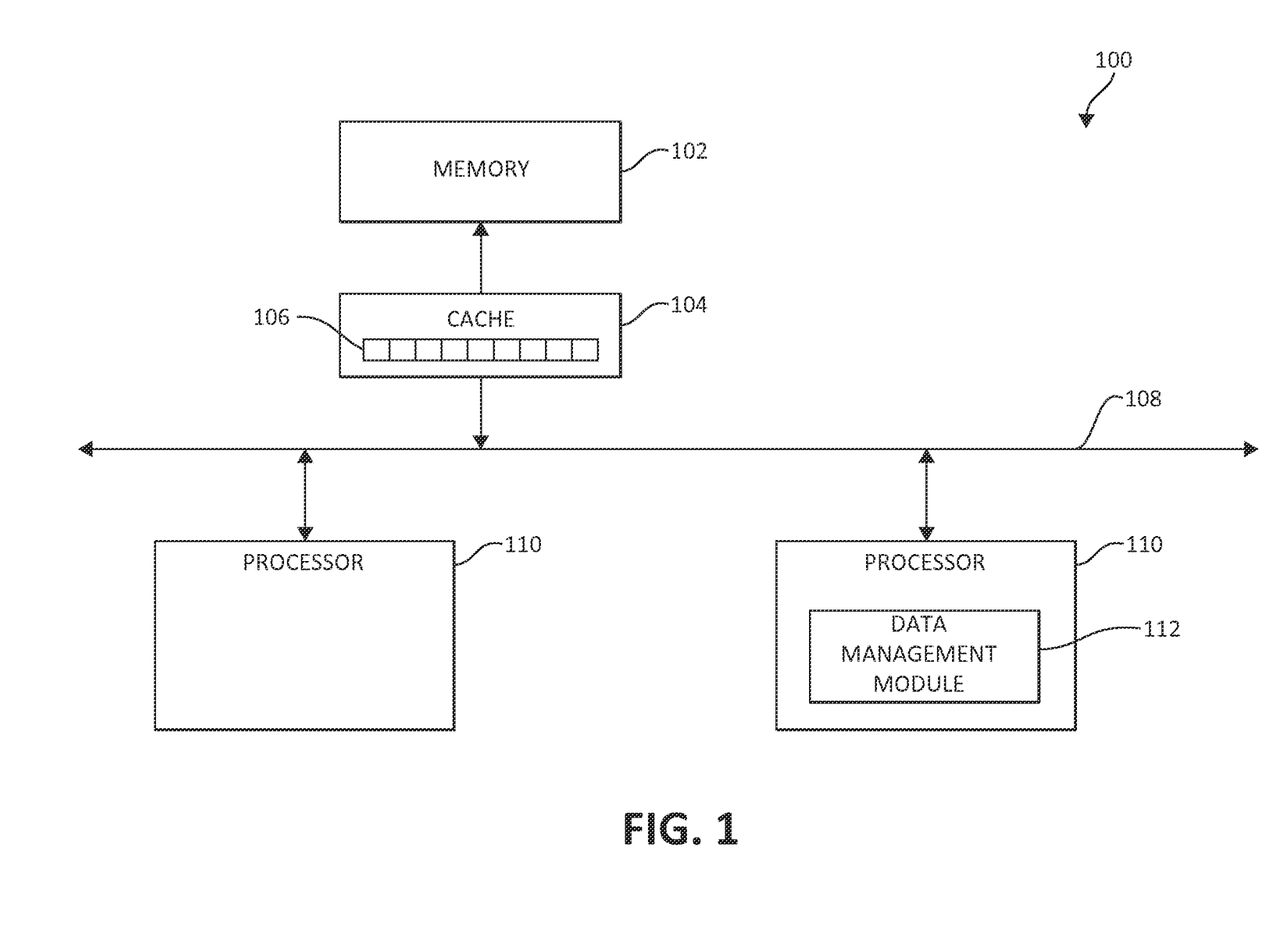
FIG. 1 is an exemplary block diagram showing a hardware structure for data and task management in which aspects of the present invention may be realized.

Turning to FIG. 1, a block diagram of one embodiment of a system 100 for task management, incorporating various aspects of the present invention, is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

An additional processor 110 is shown operational in the system 100. Both processors 110 may share resources, such as access to a similar cache level as previously described.

In various embodiments, processor 110 comprises or has access to a data management module 112, which comprises computer-readable code that, when executed by processor 110, causes processor 110 to perform various data and task management operations. In the various embodiments, processor 110 is configured for maintaining lists of TCBs in a processor-specific manner, such that each of the multiple processor devices is assigned a local TCB list.

In various other embodiments, processor 110 is configured for allocating a TCB from the local TCB list to a process executing on one of the multiple processor devices to which the local TCB list is assigned, and removing the TCB from the local TCB list.

In various other embodiments, processor 110 is configured for determining if the TCB is available to be allocated to the process in the local TCB list.

In various other embodiments, processor 110 is configured for, if the TCB is not available in the local TCB list, fetching an additional TCB from a global TCB list to populate the local TCB list.

In various other embodiments, processor 110 is configured for, when the process frees the TCB, returning the TCB to the local TCB list in a First-In-First-Out order such that a new allocation will receive a most recently used TCB.

In various other embodiments, processor 110 is configured for determining if a number of available TCBs on the local TCB list exceeds a predetermined threshold.

Finally, in various other embodiments, processor 110 is configured for, if the number of available TCB's on the local TCB list exceeds the predetermined threshold, reassigning a predetermined number of TCBs from the local TCB list to the global TCB list.

Figure 2:
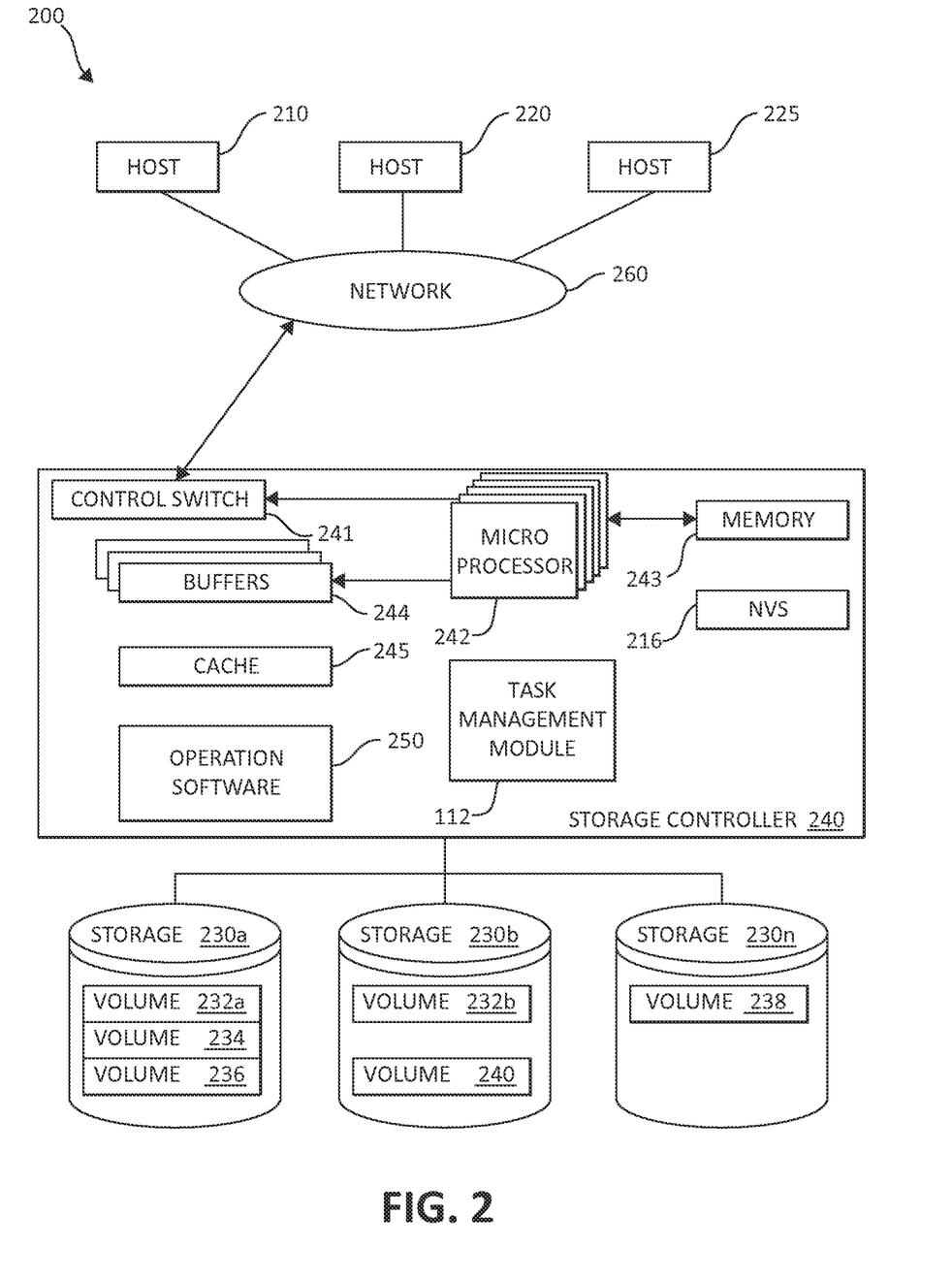
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as one of an available plurality of processing units, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include a data management module 112. The data management module 112 may incorporate internal memory (not shown) in which various mechanisms according to aspects of the present invention are stored or otherwise implemented. The data management module 112 may work in conjunction with each and every component of the storage controller 240, the hosts 210, 220, 225, and other storage controllers 240 and hosts 210, 220, and 225 that may be remotely connected via the storage fabric 260. Data management module 112 may be structurally one complete module or may be associated and/or included with other individual modules. Data management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the data management module 112, in which information may be set. The multiple buffers 244 may be implemented to assist with the methods and steps as described herein.

As previously indicated, mechanisms of the illustrated embodiments may implement processor-specific lists of TCBs in the storage environment, such that, for example, each CPU in the system is associated with a local list of TCBs. When, for example, a process running on a particular CPU requires a free TCB, an exemplary allocation may occur as follows. First, if there are no available TCBs in the given local list, a predetermined number (e.g., N) TCBs may be fetched from a global TCB list to populate the local list. Second, a TCB from the local list may then be given to the running process, and removed from the local list.

Finally, when the process concludes execution and frees a particular TCB, the instant TCB is then returned to the local list for the CPU in which the process has been executing.

In one embodiment, the return of the TCB to the local list may occur in a First-In-First-Out (FIFO) manner, such that the next TCB allocation will receive the most recently used TCBs. If the local list is at a certain threshold X, for example, a predetermined number (e.g., M) TCBs may then be freed back to the global TCB list.

Figure 3:
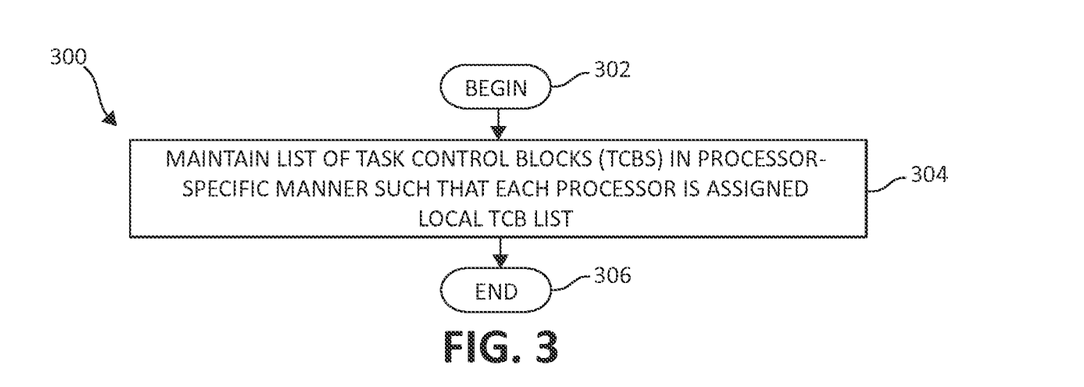
FIG. 3 is a flow chart diagram illustrating an exemplary method for increased efficiency in task management, again in which aspects of the present invention may be realized.

Turning now to FIG. 3, a flow chart diagram, illustrating an exemplary method 300 for improved data management in which various aspects of the illustrated embodiments may be incorporated. Method 300 begins (step 302). A list of Task Control Blocks (TCBs) are maintained in a processor-specific manner. The list is maintained such that each processor in the environment is assigned a respective local TCB list (step 304). Method 300 then ends (step 306).

Figure 4:
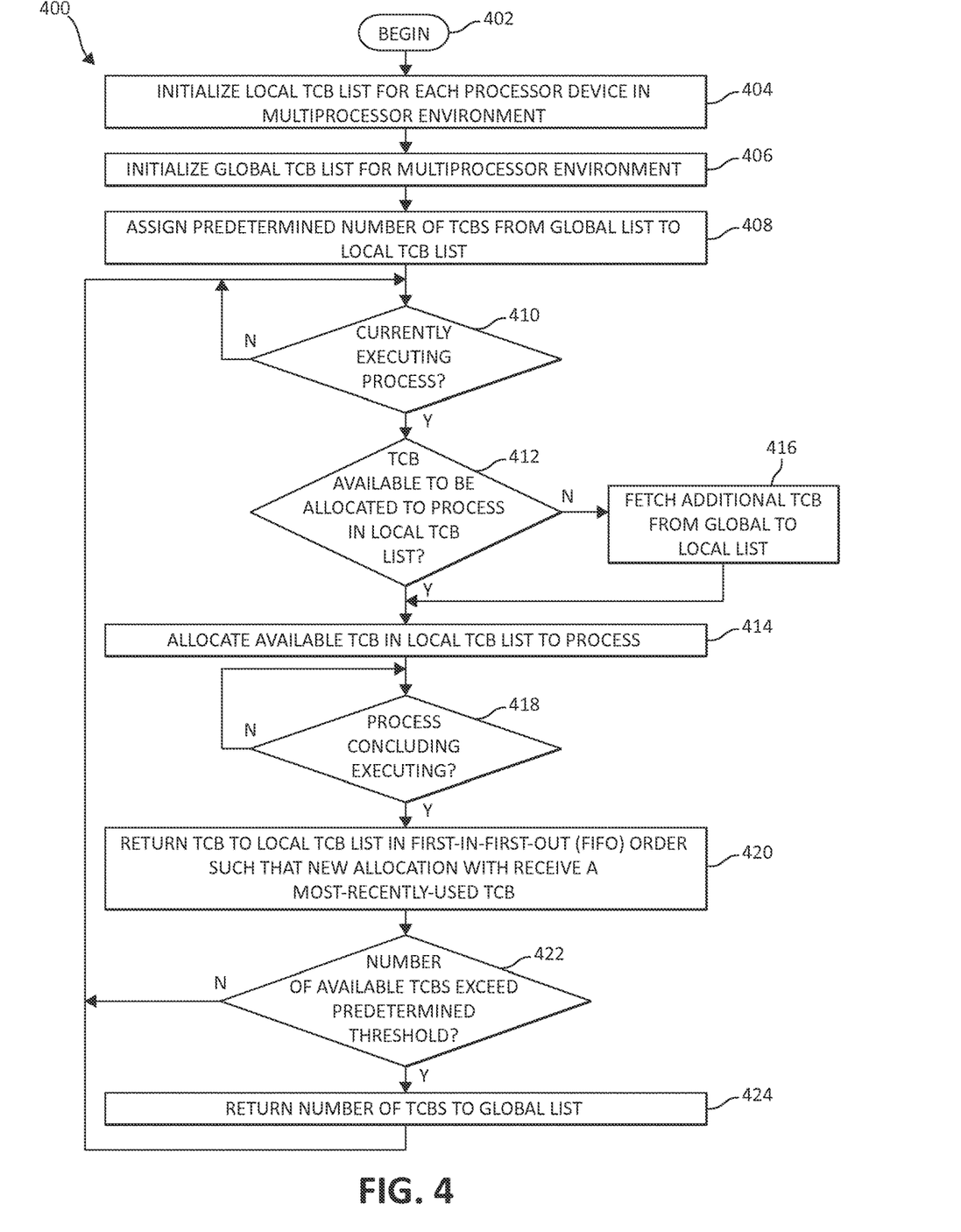
FIG. 4 is an additional flow chart diagram illustrating an exemplary method for task management in a computing environment, again in which aspects of the present invention may be implemented.

FIG. 4, following, is an additional flow chart diagram depicting an exemplary method 400 of operation for enhancing storage performance in a computing environment in accordance with the present invention. Method 400 begins (step 402) by initializing a local TCB list for each processor device in the multiprocessor environment (step 404). In a subsequent step, a global TCB list is also initialized (step 406).

Moving now to step 408, a predetermined number of TCBs are fetched from the global list to be assigned to each of the local TCB lists, respectively. In a following decision step 410, method 400 queries if a currently executing process is in need of a free TCB. If so, the method 400 moves to step 412; otherwise the method 400 returns to step 410.

In following decision step 412, if a TCB is available in the local TCB list to be assigned to the executing process, the method 400 moves to step 414, where the available, TCB in the local list is allocated to the process; otherwise, (returning to step 412) if a TCB is not available in the local TCB list, the method 400 moves to step 416, where an additional TCB is fetched from the global TCB list and allocated to the running process.

Once the TCB is fetched and allocated in steps 412, 414, and 416, the method 400 moves to step 418, which queries whether the executing process has concluded executing. If yes, the method 400 moves to step 420, which returns the TCB to the local TCB list in a FIFO order as previously described.

Method 400 continues to step 422, which queries if a number of available TCB's on the local list exceed a predetermined threshold. If no, the method 400 returns to step 410 as shown. If yes, then a number of TCBs are returned from the local TCB list to the global TCB list. This number may be a predetermined number, or it may be a number sufficient to bring the available TCBs in the applicable local list to an amount under the predetermined threshold, as one of ordinary skill in the art will appreciate. The method 400 then returns to step 410.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for data management in a computing storage environment comprising a storage controller that controls a mass storage system and schedules processes to be executed on multiple physical processor devices operating within the storage controller, the method comprising:

maintaining a global Task Control Block (TCB) list, and a plurality of local TCB lists, wherein each of the local TCB lists are maintained in a processor-specific manner by one of the multiple physical processor devices, such that each of the multiple physical processor devices operating within the storage controller is assigned a different local TCB list;

prior to executing a process on one of the multiple physical processor devices, initializing the local TCB list of each of the multiple physical processor devices with a respective predetermined number of TCBs allocated to the local TCB list from the global TCB list; wherein the respective predetermined number is a positive integer;

executing the process on a particular one of the multiple physical processor devices; and while the process executes, and in response to determining that the process executing on the particular one of the multiple physical processor devices is in need of a free TCB, allocating a TCB to the process from the local TCB list assigned to the particular physical processor device, and returning the TCB to the local TCB list assigned to the particular physical processor device when the process has concluded executing; wherein pursuant to allocating the TCB from the local TCB list to the process, if no available TCBs exist in the local TCB list, an additional TCB is fetched from the global TCB list to populate the local TCB list such that the additional TCB is allocated from the local TCB list to the process subsequently to being fetched, and wherein upon the conclusion of the executing process, only excess TCBs beyond the respective predetermined number for the one of the multiple physical processor devices are returned from the local TCB list to the global TCB list to maintain the local TCB list with the respective predetermined number of TCBs.

2. The method of claim 1, wherein when the process concludes execution, returning the TCB to the local TCB list in an order such that a new allocation will receive a most recently used TCB.

3. A system for data management in a computing storage environment comprising a storage controller that controls a mass storage system and schedules processes to be executed on multiple physical processor devices operating within the storage controller, comprising:

at least one of the multiple physical processor devices that:

maintains a global Task Control Block (TCB) list, and a plurality of local TCB lists, wherein each of the local TCB lists are maintained in a processor-specific manner, such that each of the multiple physical processor devices operating within the storage controller is assigned a different local TCB list;

prior to executing a process on one of the multiple physical processor devices, initializes the local TCB list of each of the multiple physical processor devices with a respective predetermined number of TCBs allocated to the local TCB list from the global TCB list; wherein the respective predetermined number is a positive integer;

executes the process on a particular one of the multiple physical processor devices; and while the process executes, and in response to determining that the process executing on the particular one of the multiple physical processor devices is in need of a free TCB, allocates a TCB to the process from the local TCB list assigned to the particular physical processor device, and returning the TCB to the local TCB list assigned to the particular physical processor device when the process has concluded executing; wherein pursuant to allocating the TCB from the local TCB list to the process, if no available TCBs exist in the local TCB list, an additional TCB is fetched from the global TCB list to populate the local TCB list such that the additional TCB is allocated from the local TCB list to the process subsequently to being fetched, and wherein upon the conclusion of the executing process, only excess TCBs beyond the respective predetermined number for the one of the multiple physical processor devices are returned from the local TCB list to the global TCB list to maintain the local TCB list with the respective predetermined number of TCBs.

4. The system of claim 3, wherein the at least one available processor, when the process concludes execution, returning the TCB to the local TCB list in an order such that a new allocation will receive a most recently used TCB.

5. A computer program product for data management in a computing storage environment comprising a storage controller that controls a mass storage system and schedules processes to be executed on multiple physical processor devices operating within the storage controller, the computer program product comprising a non-transitory computer-readable storage medium having computer-readable program code portions stored therein, the computer-readable program code portions comprising:

a first executable portion that, when executed, maintains a global Task Control Block (TCB) list, and a plurality of local TCB lists, wherein each of the local TCB lists are maintained in a processor-specific manner by one of the multiple physical processor devices, such that each of the multiple physical processor devices operating within the storage controller is assigned a different local TCB list;

a second executable portion that, when executed, and prior to executing a process on one of the multiple physical processor devices, initializes the local TCB list of each of the multiple physical processor devices with a respective predetermined number of TCBs allocated to the local TCB list from the global TCB list; wherein the respective predetermined number is a positive integer;

a third executable portion that, when executed, executes the process on a particular one of the multiple physical processor devices; and a fourth executable portion that, when executed while the process executes and in response to determining that the process executing on the particular one of the multiple physical processor devices is in need of a free TCB, allocates a TCB to the process from the local TCB list assigned to the particular physical processor device, and returning the TCB to the local TCB list assigned to the particular physical processor device when the process has concluded; wherein pursuant to allocating the TCB from the local TCB list to the process, if no available TCBs exist in the local TCB list, an additional TCB is fetched from the global TCB list to populate the local TCB list such that the additional TCB is allocated from the local TCB list to the process subsequently to being fetched, and wherein upon the conclusion of the executing process, only excess TCBs beyond the respective predetermined number for the one of the multiple physical processor devices are returned from the local TCB list to the global TCB list to maintain the focal TCB list with the respective predetermined number of TCBs.

6. The computer program product of claim 5, further including a fourth executable portion that, when the process concludes execution, returning the TCB to the local TCB list in an order such that a new allocation will receive a most recently used TCB.

* * * * *